Patented July 29, 1947

2,424,832

UNITED STATES PATENT OFFICE 2,424,832

PROCESS FOR PRODUCING PENICILLIN

Walter L. Koerber, Kingston, N. J., assignor to E. R. Squibb & Sons, New York, N. Y., a corporation of New York No Drawing. Application January 21, 1944, Serial No. 519,191

3 Claims. (Cl. 195—36)

This invention relates to the production of penicillin, an antimicrobial agent which has been found exceptionally effective as a therapeutic.

Penicillin is now produced on a large scale by growing a penicillin-forming mold, especially *Penicillium notatum*, in submerged (i. e., deep) culture in a liquid nutrient medium. In this process, the mold is incubated while it is submerged in a liquid nutrient medium, which is aerated by agitation or other suitable means; the medium is then harvested (i. e., separated from the mold by centrifugation and/or filtration); and the penicillin is recovered from the harvested medium (i. e., the culture filtrate). Usually, the penicillin is recovered as the sodium salt by procedure involving, as initial steps, extraction of the culture filtrate with amyl acetate (or other suitable organic solvent for penicillin), and extraction of the amyl-acetate solution with a buffer solution having a pH of about 6.0–6.5 (usually phosphate buffer).

In the practice of this process, a great loss of activity (i. e., yield) occurs during the period between incubation and the stage in the extraction procedure when the penicillin is in a pH 6.0–6.5 buffer solution. Thus, losses of about 50% during this period are usual, and manifestly cause a serious increase in the cost of production.

It is the object of this invention to provide more efficient processes for the production of penicillin.

It has been found that the loss of activity can be materially decreased by adjusting the pH of the medium which usually is about 7.7 when the highest titer is attained, and may rise as high as about 8.5 in the filtrate at the end of the harvesting) to about 6.0–6.5 before the harvesting, and especially by maintaining that pH while harvesting; and preferably by maintaining the pH of the medium at about 6.0–6.5 during the entire incubation period.

The pH adjustment and/or maintenance may be effected by the addition of any non-oxidizing acid, inter alia phosphoric, hydrochloric, citric, sulfurous, acetic, and boric. The preferred acid is phosphoric, because in most instances no new radical is introduced thereby (a phosphate being present in the usual media, and phosphate buffers being generally employed in the extraction procedure).

The following examples are illustrative of the invention (the potency unit referred to being the Florey, or Oxford, unit used in the United States of America for standardizing therapeutic penicillin preparations):

Example 1

(a) A medium of the formula:

| | |
|---|---|
| 35 lbs. | NaNO₃ |
| 8.75 lbs. | KH₂PO₄ |
| 2 lbs. 14.75 oz. | MgSO₄·7H₂O |
| 7.3 lbs. | CaCO₃ |
| 21 gals. | Corn steep liquor |
| 53.3 lbs. | Brown sugar | made up to 700 gals. with tap water is placed in a tank and sterilized (in the usual manner), an inoculum of *Penicillium notatum* (spores) is added, and the medium is incubated at 25° C. while stirred and maintained under an air pressure of 15 lbs., air being passed in through a sparger at the rate of 8–10 cubic feet/minute. When the pH of the medium reaches 7.7, it is adjusted to 6.5 by adding 75% phosphoric acid, the tank contents are cooled, and the medium is separated from the mold by centrifugation and/or filtration.

(b) The filtrate (which has about 90% of the activity of the medium before harvesting) is extracted with amyl acetate while cooling, and the amyl-acetate solution is extracted with ⅕ volume of a 4% pH 6.5 phosphate-buffer solution; the buffer solution (which has about 76% of the activity of the medium before harvesting) is acidified with concentrated phosphoric acid to pH 2.0–2.5, and extracted with an equal volume of chloroform; the chloroform solution is extracted with ⅕ volume of a 4% pH 6.0 phosphate-buffer solution; and the cooled buffer solution is acidified with concentrated phosphoric acid to pH 2.0–2.5 and extracted with ½ volume of ether; and the ether solution is extracted with a 1% sodium-bicarbonate solution. The resulting solution of sodium-penicillin is frozen and subjected to a high vacuum to sublime out the water; and the salt is then further dried by placing it in a desiccator over phosphorus pentoxide, and maintaining it under vacuum at 34° C. until the moisture content of the salt falls to about 0.5–1.3%, which further drying takes about 48 hours. The product has about 37% of the activity of the medium before harvesting. By way of comparison, the yields corresponding to the aforementioned 90%, 76% and 37% when operating without pH adjustment before harvesting are respectively 42%, 36% and 24%.

Example 2

The same medium (as in the foregoing example) is placed in a tank and sterilized (in the usual manner) an inoculum of *Penicillium notatum* (spores) is added, and the medium is incubated at 25° C. while stirred and maintained under an air pressure of 15 lbs. with air passed in through a sparger at the rate of 8–10 cubic feet/minute. During the incubation, 75% phosphoric acid is continuously or intermittently added under sterile conditions at such rate as to maintain the pH at 6.0–6.5. When the maximum penicillin titer has been obtained, the tank contents are cooled and the medium is separated from the mold by centrifugation and filtration. The filtrate is then treated as described in Example 1 (b) to obtain a dried sodium-penicillin.

Inasmuch as the pH adjustment of the medium described in these examples does not affect the action of decomposing enzymes, especially penicillinase, the addition of agents capable of counteracting these enzymes is desirable. One or more of such agents (e. g., enzyme poisons such as chloroform, halides, heavy-metal salts, urea, or counteracting enzymes such as trypsin) are introduced into the tank along with or after the addition of the acid.

The medium employed in the foregoing examples may of course be replaced by other liquid nutrient media suitable for the production of penicillin by submerged culture, e. g., by other media disclosed in the Foster et al. application Serial No. 487,140, filed May 15, 1943, or by the media, especially the "synthetic" media, disclosed in the application of R. B. McCormack, Serial No. 519,207, filed January 21, 1944, which media are characterized by inclusion of an inorganic, water-soluble sulfite-type compound, a typical example thereof being a medium of the following formula:

| | | |
|---|---|---|
| $KH_2PO_4$ | grams | 1.5 |
| $MgSO_4 \cdot 7H_2O$ | do | 0.5 |
| $NaNO_3$ | do | 6.0 |
| $CaCO_3$ | do | 5.0 |
| Glucose | do | 20.0 |
| $Na_2SO_3$ | do | 3.0 |
| Liter tap water | | 1 |

The invention is also applicable to the production of penicillin or related antibiotics by the growth (in submerged culture) of suitable strains of antibiotic-forming molds other than *Penicillium notatum*, inter alia *Penicillium chrysogenum* and *Aspergillus flavus*; and the term "penicillin," as generically employed in the claims, is accordingly to be understood as embracing such related antibiotics.

The invention may be variously otherwise embodied within the scope of the appended claims.

I claim:

1. The process for the production of penicillin comprising growing a penicillin forming mold of the *Penicillium notatum-chrysogenum* group in submerged culture in a liquid nutrient medium until substantially maximum penicillin titer is attained, then adjusting the pH of the medium to about 6.0–6.5, and harvesting.

2. The process for the production of penicillin comprising growing a penicillin forming mold of the *Penicillium notatum-chrysogenum* group in submerged culture in a liquid nutrient medium until substantially maximum penicillin titer is attained, then adjusting the pH of the medium to about 6.0–6.5, and maintaining that pH while harvesting.

3. The process for the production of penicillin comprising growing a penicillin forming mold of the *Penicillium notatum-chryspogenum* group in submerged culture in a liquid nutrient medium until substantially maximum penicillin titer is attained, then adjusting the pH of the medium to about 6.0–6.5 by adding phosphoric acid, and harvesting.

WALTER L. KOERBER.

REFERENCES CITED

The following references are of record in the file of this patent:

Coghill, Monthly Progress Report No. 3, May 2, 1942. Distributed by Committee on Medical Research, O. S. RD, page 2.

Coghill, ibidem, Report No. 20, July 5, 1944, pages 1, 2, 4, and 5.

Reid, Jr. of Bacteriology, vol. 29 (1935), page 219.

Abraham et al., The Lancet, Aug. 16, 1941, pages 177 and 179.

Challinor, Nature, Dec. 12, 1942, page 688.

Foster et al., Jr. of Bacteriology, Nov., 1943, page 428.